(12) United States Patent
Cho et al.

(10) Patent No.: US 11,407,900 B2
(45) Date of Patent: Aug. 9, 2022

(54) PEARLESCENT PIGMENT FOR SECURITY PURPOSES INCLUDING ORGANIC OR INORGANIC FLUORESCENT MATERIAL

(71) Applicant: CQV CO., LTD., Chungcheongbuk-do (KR)

(72) Inventors: Kum-sung Cho, Chungcheongbuk-do (KR); Kyung-don Nam, Chungcheongbuk-do (KR); Jae-il Jeong, Chungcheongbuk-do (KR); Kwang-choong Kang, Chungcheongbuk-do (KR); Byung-ki Choi, Chungcheongbuk-do (KR); Kwang-soo Lim, Chungcheongbuk-do (KR); Kil-wan Chang, Chungcheongbuk-do (KR)

(73) Assignee: CQV CO., LTD., Chungcheongbuk-Do (KR)

( * ) Notice: Subject to any disclaimer, the term of this patent is extended or adjusted under 35 U.S.C. 154(b) by 116 days.

(21) Appl. No.: 16/753,924

(22) PCT Filed: Sep. 19, 2018

(86) PCT No.: PCT/KR2018/011037
§ 371 (c)(1),
(2) Date: Apr. 6, 2020

(87) PCT Pub. No.: WO2019/107720
PCT Pub. Date: Jun. 6, 2019

(65) Prior Publication Data
US 2020/0354579 A1     Nov. 12, 2020

(30) Foreign Application Priority Data
Nov. 30, 2017  (KR) .................. 10-2017-0163687

(51) Int. Cl.
*C09C 1/00*     (2006.01)
*C09C 1/02*     (2006.01)
(Continued)

(52) U.S. Cl.
CPC .............. *C09C 1/0015* (2013.01); *C09C 1/02* (2013.01); *C09C 1/24* (2013.01); *C09C 1/28* (2013.01);
(Continued)

(58) Field of Classification Search
CPC ..................... C09C 1/0015; C09C 2210/50
See application file for complete search history.

(56) References Cited

U.S. PATENT DOCUMENTS

| | | | | |
|---|---|---|---|---|
| 6,565,770 B1 * | 5/2003 | Mayer | ................... | B82Y 10/00 106/403 |
| 2003/0089273 A1 * | 5/2003 | Potrawa | ................. | C07F 5/003 106/31.15 |

(Continued)

FOREIGN PATENT DOCUMENTS

| | | | |
|---|---|---|---|
| JP | 2008069323 A | * | 3/2008 |
| KR | 10-2014-0011347 A | | 1/2014 |

(Continued)

OTHER PUBLICATIONS

Machine translation JP2008-069323 (Year: 2008).*
International Search Report for PCT/KR2018/011037 dated Dec. 20, 2018.

*Primary Examiner* — Alexandre F Ferre
(74) *Attorney, Agent, or Firm* — The PL Law Group, PLLC

(57) ABSTRACT

A pearlescent pigment for security purposes according to an embodiment of the present invention includes a single or a plurality of coating layers containing a metal oxide and an organic or inorganic fluorescent material. Since the pearlescent pigment for security purposes according to the pres- (Continued)

ent disclosure includes a fluorescent layer containing the organic or inorganic fluorescent material, it can be used as a pigment for security purposes due to its optical characteristics and can also provide effects such as magnetism, high color intensity, multiple colors, etc. Also, since the pearlescent pigment for security purposes has aesthetic benefit and security characteristic at the same time, it is economical, easy to use and applicable in various industries.

7 Claims, 10 Drawing Sheets

(51) Int. Cl.
  *C09C 1/24* (2006.01)
  *C09C 1/28* (2006.01)
  *C09C 3/06* (2006.01)
  *C09C 3/10* (2006.01)
  *C09K 11/06* (2006.01)
  *C09K 11/08* (2006.01)
  *C09K 11/56* (2006.01)

(52) U.S. Cl.
  CPC ............... *C09C 3/063* (2013.01); *C09C 3/10* (2013.01); *C09K 11/06* (2013.01); *C09K 11/0838* (2013.01); *C09K 11/0883* (2013.01); *C09K 11/56* (2013.01); *C01P 2004/03* (2013.01); *C01P 2004/61* (2013.01); *C01P 2004/62* (2013.01); *C09C 2200/102* (2013.01); *C09C 2200/30* (2013.01); *C09C 2210/50* (2013.01); *C09K 2211/1011* (2013.01)

(56) References Cited

U.S. PATENT DOCUMENTS

| | | | |
|---|---|---|---|
| 2004/0027059 A1 | 2/2004 | Tsutsui | |
| 2009/0249979 A1 | 10/2009 | Kaupp et al. | |
| 2011/0306678 A1* | 12/2011 | Liu | C09C 1/0024 514/770 |
| 2014/0165878 A1* | 6/2014 | Chang | C09C 1/0024 106/418 |

FOREIGN PATENT DOCUMENTS

| | | |
|---|---|---|
| KR | 10-1396843 B1 | 5/2014 |
| KR | 10-2015-0021035 A | 2/2015 |
| KR | 10-1858414 B1 | 5/2018 |
| WO | WO 2009/135784 A1 | 11/2009 |

* cited by examiner

PEARLESCENT PIGMENT FOR SECURITY PURPOSES INCLUDING ORGANIC OR INORGANIC FLUORESCENT MATERIAL

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/011037 filed on Sep. 19, 2018, which claims priority to the benefit of Korean Patent Application No. 10-2017-0163687 filed in the Korean Intellectual Property Office on Nov. 30, 2017, the entire contents of which are incorporated herein by reference.

TECHNICAL FIELD

The present disclosure relates to a pearlescent pigment for security purposes including a single or a plurality of coating layers containing a metal oxide and an organic or inorganic fluorescent material.

BACKGROUND ART

Recently, the importance of preventing imitation and counterfeiting of all types of products including high value-added exclusive products is increasing. Especially, since medicine or machinery parts are products that can be imitated or counterfeited easily, consumers are exposed to environments where they can suffer from damages unexpectedly directly or indirectly.

In addition, the anti-counterfeiting technology is being developed consistently because counterfeiting of bank notes, gift certificates and identity documents such as passports, resident cards, driver's licenses, etc. occurs and counterfeit notes are circulated globally.

As the technology of preventing such imitation and counterfeiting, a variety of printing-based anti-counterfeiting technologies have been developed, such as a hologram whose color varies depending on viewing angles using a microdiffraction structure and intaglio printing on an incised printing surface. In addition, a fluorescent ink emitting fluorescence at a specific wavelength, a color-shifting ink whose color changes depending on temperature, etc. have been developed for use in determining counterfeiting.

However, counterfeiting technologies are being advanced and becoming sophisticated more and more with the recent development of the technology of representing colors freely. Accordingly, better anti-counterfeiting technologies are required.

In particular, development of pigments for anti-counterfeiting is necessary since security pigments are currently being imported from the US, Japan and Western European developed countries such as Germany, the UK, etc. with high royalties.

A pearlescent pigment refers to a pigment which exhibits specific pearlescent color, rainbow color or metal color with gloss effect using optical and refraction characteristics. Whereas general pigments exhibit given colors only, the pearlescent pigment exhibits various colors depending on viewing angles. Therefore, it can be used in various industries and is being researched and developed consistently.

For example, a method for preparing a pearlescent pigment using plate-like alumina crystals including aluminum oxide, zinc oxide and tin oxide as main components in order to increase the reflexibility and aspect ratio of the pearlescent pigment has been studied (Korean Patent Registration Publication No. 10-1396843).

However, because the pearlescent pigment is mainly for enhancing aesthetic effect, research and development for extending application to various fields are necessary.

SUMMARY

The inventors of the present disclosure have made efforts to develop a pigment for security purposes which cannot be counterfeited easily. In doing so, they have prepared a pearlescent pigment for security purposes, which includes a fluorescent layer containing an organic or inorganic fluorescent material suitable for use in pigments and a single or a plurality of coating layers containing a metal oxide, useful as a pigment for security purposes and capable of providing effects such as magnetism, high color intensity, multiple colors, etc., and have completed the present disclosure by identifying the effects.

Therefore, the present disclosure is directed to providing a pearlescent pigment for security purposes, which is capable of exhibiting fluorescent characteristics by containing an organic or inorganic fluorescent material and is capable of providing effects such as magnetism, high color intensity, multiple colors, etc.

The present disclosure provides a pearlescent pigment for security purposes, which includes:

a flake substrate;

a single or a plurality of coating layers formed on the surface of the flake substrate and containing a metal oxide; and a fluorescent layer formed on the surface of the coating layer and containing an organic fluorescent material or an inorganic fluorescent material.

A metal of the metal oxide may be any one or more selected from a group consisting of silicon (Si), titanium (Ti), zirconium (Zr), antimony (Sb), zinc (Zn), tin (Sn), iron (Fe), magnesium (Mg), manganese (Mn), aluminum (Al), cobalt (Co) and barium (Ba).

The metal oxide may be $Fe_3O_4$.

The plurality of coating layers containing the metal oxide may include:

a first coating layer containing $Fe_2O_3$;

a second coating layer formed on the surface of the first coating layer and containing $MgO.SiO_2$, and a third coating layer formed on the surface of the second coating layer and containing $Fe_2O_3$.

The plurality of coating layers containing the metal oxide may include:

a first coating layer containing $TiO_2$;

a second coating layer formed on the surface of the first coating layer and containing $MgO.SiO_2$ or $SiO_2$, and a third coating layer formed on the surface of the second coating layer and containing $TiO_2$.

The organic fluorescent material may be any one or more selected from a group consisting of tetraphenylnaphthacene, tris(1-pneylisoquinoline)iridium(III), bis(2-benzo[b]thiophen-2-yl-pyridine)(acetylacetonate)iridium(III), tris[4,4'-di-t-ert-butyl-(2,2')-bipyridine]ruthenium(III), DCM1 (4-dicayanomethylene-2-methyl-6-(p-dimethylaminostyryl)-4H-pyran), DCM2 (4-dicayanomethylene-2-methyl-6-(julolidin-4-yl-vinyl)-4H-pyran), europium(III) thenoyltrifluoroacetone, butyl-6-(1,1,7,7-tetramethyljulolidinyl-9-enyl)-4H-pyran) and (1,10-phenanthroline)-tris-(4,4,4-trifluoro-1-(2-thienyl)-butane-1,3-dionate)europium(III).

The organic fluorescent material may be a particle having an average particle diameter ($D_{50}$) of 10-200 nm.

The inorganic fluorescent material may be any one or more selected from a group consisting of an oxide-based fluorescent material, a garnet-based fluorescent material, a silicate-based fluorescent material, a sulfide-based fluorescent material, an oxynitride-based fluorescent material and a nitride-based fluorescent material.

The fluorescent layer may contain an acryl-based organic binder resin.

The fluorescent layer may have a thickness of 10-500 nm.

The fluorescent layer may contain an organic-inorganic hybrid fluorescent material.

A security product to which the pearlescent pigment for security purposes is applied may be any one of a medicine, a machinery part, a bank note, a check, a credit card, a check card, a security, a gift certificate, a passport, a resident card, a driver's license, an identity document, a certificate of authentication, a revenue stamp, a postage stamp, an identification card, a train ticket, an airplane ticket, an admission ticket, a telephone card, a label, a test stamp and a packaging material.

The feature of the pearlescent pigment for security purposes according to the present disclosure is that, because it includes a fluorescent layer, it can be used as a pigment for security purposes due to optical characteristics and can provide effects such as magnetism, high color intensity, multiple colors, etc.

In addition, since the pearlescent pigment has aesthetic benefit and security characteristic at the same time, it is economical, easy to use and applicable in various industries.

DETAILED DESCRIPTION

Figure 1:
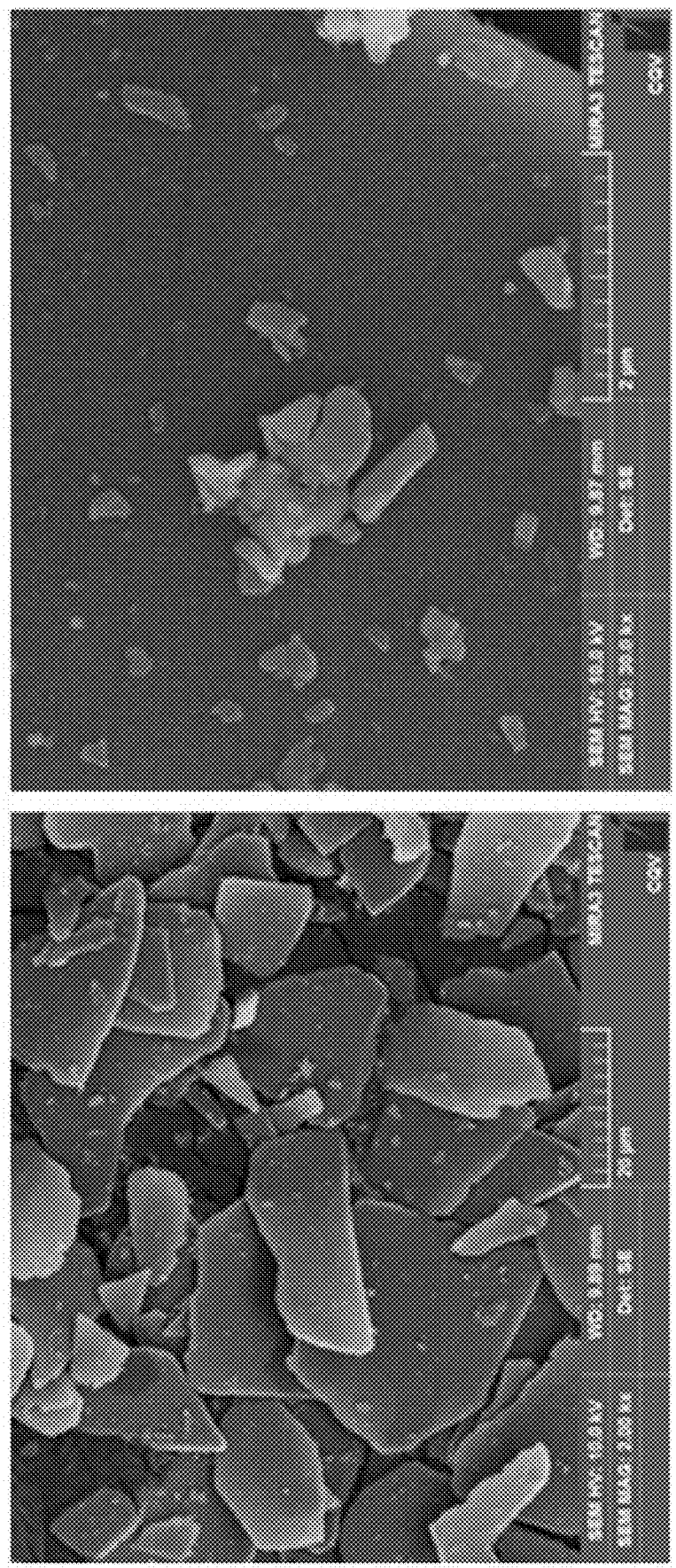
FIG. 1 shows the SEM images of an organic fluorescent material-coated security pigment prepared according to an exemplary embodiment of the present disclosure.

Hereinafter, the present disclosure is described in detail.

The terms or words used in the present specification and claims should not be interpreted as being limited to common or dictionary meanings, but should be interpreted based on the principle that an inventor may appropriately define the concepts of terms in order to describe his/her invention in the best way.

The present disclosure relates to a pearlescent pigment for security purposes containing an organic or inorganic fluorescent material.

A pearlescent pigment exhibits two or more colors depending on viewing angles as the light passing through a pigment layer is partly reflected and partly refracted. Because it can represent unique beauty as compared to general pigments or dyes, it is widely used in automotive coatings, cosmetics, wallpaper, flooring materials, extrusion/injection-molded plastics, artificial leather, printing inks, paints, etc.

The present disclosure provides a pearlescent pigment for security purposes, which includes:

a flake substrate;

a single or a plurality of coating layers formed on the surface of the flake substrate and containing a metal oxide; and a fluorescent layer formed on the surface of the coating layer and containing an organic fluorescent material or an inorganic fluorescent material.

As the flake substrate, a substrate including one or more of synthetic mica, natural mica, glass flake, plate-like iron oxide, plate-like alumina, aluminum flake, plate-like silica, talc and bismuth may be used, although not being limited thereto.

For example, a substrate prepared by uniformly dispersing synthetic mica particles by adding a surfactant to synthetic mica pulverized into fine powder using a water mixer may be used. When such a substrate is used, the coating layer containing the metal oxide may be adsorbed uniformly on the surface of the substrate, and superior gloss and chroma may be achieved.

Specifically, the flake substrate may be a plate-like substrate with a particle diameter of 5-250 μm. If the size of the particle diameter is smaller than 5 μm, the plate-like substrate is changed into a spherical shape as the coating thickness on the surface of the substrate is increased. That is to say, the aspect ratio is decreased and, as a result, light scattering occurs due to diffuse reflection and the same color with the same refractive index cannot be obtained.

On the contrary, if the particle diameter exceeds 250 μm, the formation of the coating layer for obtaining the desired color may be difficult due to increase in coated surface area.

A metal of the metal oxide may be any one or more selected from a group consisting of silicon (Si), titanium (Ti), zirconium (Zr), antimony (Sb), zinc (Zn), tin (Sn), iron (Fe), magnesium (Mg), manganese (Mn), aluminum (Al), cobalt (Co) and barium (Ba).

Specific examples may include titanium dioxide ($TiO_2$), iron oxide ($Fe_2O_3$), tin dioxide ($SnO_2$), zirconium dioxide ($ZrO_2$), silicon dioxide ($SiO_2$), aluminum oxide ($Al_2O_3$), magnesium oxide (MgO), manganese dioxide ($MnO_2$), etc.

The metal oxide may be $Fe_3O_4$.

If the coating layer contains $Fe_3O_4$, the effect of increased magnetism may be obtained. In addition, the inclusion of iron oxide ($Fe_3O_4$) makes it possible to obtain an unharmful pigment with black gloss since the existing black glossy pigment contains harmful cobalt (Co) as a main component.

Specifically, a pigment may be prepared by forming the coating layer containing $Fe_3O_4$ as follows.

First, after preparing a dilute iron sulfate solution containing iron sulfate ($FeSO_4.7H_2O$) and mixing with a flake substrate in purified water (D.I. water), a substrate suspension is formed by stirring and dispersing the same. Then, after titrating an inorganic salt solution into the substrate suspension, the aqueous inorganic salt solution is hydrolyzed and then mixed with the dilute iron sulfate solution, so that a coating layer is formed as the flake substrate is coated on the surface.

The pigment including the coating layer prepared as described above has increased blackness and saturated magnetism as compared to the black pigment containing a cobalt (Co) component.

The magnetism-enhanced security pigment may be used for a printing ink, a bank draft, a check, a passport, an identity document, a smart card, a driver's license, a check card, a postage stamp, a ticket, a credit card, a gift certificate, etc.

The coating layer containing the metal oxide may be deposited on the flake substrate by PVD (physical vapor deposition) or CVD (chemical vapor deposition).

The plurality of coating layers containing the metal oxide may include:

a first coating layer containing $Fe_2O_3$;

a second coating layer formed on the first coating layer surface and containing $MgO.SiO_2$; and a third coating layer formed on the first second coating layer surface and containing $Fe_2O_3$.

The first coating layer and the third coating layer containing $Fe_2O_3$ have higher refractive indices than the second coating layer containing $MgO.SiO_2$.

Instead of $MgO.SiO_2$, a metal oxide having a refractive index (n) of 1.8 or lower may be used.

The plurality of coating layers containing the metal oxides of high refractive index/low refractive index/high refractive index may exhibit high color intensity using the difference in the refractive indices of the coating layers because the coating layer containing the metal oxide with a low refractive index is located between the coating layers containing the metal oxide with high refractive indices.

Specifically, each the first coating layer containing $Fe_2O_3$, the second coating layer containing $MgO.SiO_2$ and the third coating layer containing $Fe_2O_3$ may be formed to have a thickness of 20-500 nm.

If the thickness is outside the above range, it may be difficult to achieve the desired color.

In addition, the plurality of coating layers containing the metal oxide may include:

a first coating layer containing $TiO_2$;

a second coating layer formed on the first coating layer surface and containing $MgO.SiO_2$ or $SiO_2$, and a third coating layer formed on the first second coating layer surface and containing $TiO_2$.

The first coating layer and the third coating layer containing $TiO_2$ exhibit higher refractive indices than the second coating layer containing $MgO.SiO_2$ or $SiO_2$.

In particular, if the low-refractive-index layer is formed using $MgO.SiO_2$, high-brightness, high-gloss and high-chroma characteristics can be achieved and defects such as cracking can be prevented since multiple colors can be represented without increasing the thickness of the low-refractive-index layer.

The pigment exhibiting high-gloss and high-chroma characteristics may exhibit optimal performance when the ratio of the second coating layer containing $MgO.SiO_2$ or $SiO_2$ is 5-10 wt % based on the total weight of the pigment.

If the ratio of the second coating layer containing $MgO.SiO_2$ or $SiO_2$ is lower than 5 wt % of the total weight of the pigment, the high-gloss characteristic may be insufficient. And, if it exceeds 10 wt %, the high-chroma characteristic may be insufficient.

The pigment exhibiting multiple colors may exhibit optimal performance when the ratio of the second coating layer containing $MgO.SiO_2$ or $SiO_2$ is 5-35 wt % based on the total weight of the pigment.

If the ratio of the second coating layer containing $MgO.SiO_2$ or $SiO_2$ is lower than 5 wt % of the total weight of the pigment, only a single color may be exhibited. And, if it exceeds 35 wt %, the color shifting characteristic may be insufficient.

Therefore, a preferred ratio of the second coating layer is 5-35 wt %, although not being limited thereto. However, it may be changed depending on the type of the substrate, the coated material, the coating thickness, etc.

The second coating layer containing $MgO.SiO_2$ or $SiO_2$ may contain one or a mixture of two or more selected from $SiO_2$, $MgO.Al_2O_3$, $K_2O.SiO_2$ and $Mg_2SiO_4$.

Specifically, a pigment may be prepared by forming a coating layer as follows.

First, after mixing a flake substrate including one or more of synthetic mica, natural mica, glass, plate-like iron oxide, plate-like alumina and plate-like silica with purified water (DI water) and forming a suspension by stirring and dispersing the same, a coating layer may be formed on the surface of the flake substrate by titrating an inorganic salt solution into the suspension and then hydrolyzing a soluble inorganic metal salt solution.

Then, after titrating a soluble inorganic salt solution containing $MgO.SiO_2$ or $SiO_2$ into the suspension and forming a second coating layer on the first coating layer surface by hydrolyzing a soluble inorganic salt solution, a third coating layer may be formed on the surface of the second coating layer by titrating a soluble inorganic metal salt solution into the suspension in which the second coating layer has been formed and then hydrolyzing a soluble inorganic metal salt solution.

The first coating layer and the third coating layer containing $TiO_2$ may contain any oxide selected from a group consisting of tin (Sn), iron (Fe), zirconium (Zr), manganese (Mn), magnesium (Mg), aluminum (Al) and cobalt (Co) instead of $TiO_2$.

As the organic fluorescent material, an organic fluorescent material known in the art may be used without particular limitation. Specifically, an organic fluorescent material exhibiting strong emission characteristics can be used for security and safety purposes.

The organic fluorescent material may be any one or more selected from a group consisting of tetraphenylnaphthacene (rubrene), tris(1-pneylisoquinoline)iridium(III) (Ir(piq)$_3$), bis(2-benzo[b]thiophen-2-yl-pyridine)(acetylacetonate)iridium(III) (Ir(btp)$_2$(acac)), tris[4,4'-di-tert-butyl-(2,2')-bipyridine]ruthenium(III) (Ru(dtb-bpy)$_{3.2}$(PF$_6$)), DCM1 (4-dicayanomethylene-2-methyl-6-(p-dimethylaminostyryl)-4H-pyran), DCM2 (4-dicayanomethylene-2-methyl-6-(julolidin-4-yl-vinyl)-4H-pyran), europium(III) thenoyltrifluoroacetone (Eu(TTA)$_3$), butyl-6-(1,1,7,7-tetramethyljulolidinyl-9-enyI)-4H-pyran) (DCJTB) and (1,10-phenanthroline)-tris-(4,4,4-trifluoro-1-(2-thienyl)-butane-1,3-dionate)europium(III) (Eu(TTA)$_3$Phen).

In addition, a nitrogen-containing aromatic compound such as a phenylene-based polymer, phenylene-vinylene-based polymer, a thiophene-based polymer, a fluorine-based polymer, a spiro-fluorene-based polymer, etc. may be used as a polymer fluorescent material, although not being limited thereto.

The organic fluorescent material may be a particle having an average particle diameter (D$_{50}$) of 10-200 nm.

More specifically, the organic fluorescent material may be a particle having an average particle diameter (D$_{50}$) of 10-200 nm, specifically 30-150 nm, more specifically 50-100 nm.

If the average particle diameter (D$_{50}$) of the organic fluorescent material is smaller than 10 nm, improvement of optical characteristics may not occur upon UV irradiation. And, if the average particle diameter (D$_{50}$) exceeds 200 nm, adhesivity to the flake substrate may decrease.

As the inorganic fluorescent material, an inorganic fluorescent material known in the art may be used without particular limitation. Specifically, the inorganic fluorescent material may be an inorganic fluorescent material exhibiting strong emission characteristics to be suitable for security and safety purposes.

The inorganic fluorescent material may be any one or more selected from a group consisting of an oxide-based fluorescent material, a garnet-based fluorescent material, a silicate-based fluorescent material, a sulfide-based fluorescent material, an oxynitride-based fluorescent material and a nitride-based fluorescent material having an oxide as a seed crystal.

Examples include visible-emitting fluorescent materials, UV-emitting fluorescent materials, etc. such as garnet-based fluorescent materials; Y$_3$AL$_5$O$_{12}$:Ce$^{3+}$ (YAG:Ce) yellow, Tb$_3$Al$_5$O$_{12}$:Ce$^{3+}$ (TAG:Ce) yellow, silicate-based fluorescent materials; (Sr, Ba, Ca)$_2$SiO$_4$:Eu$^{2+}$ greenish yellow, (Sr, Ba, Ca, Mg, Zn)$_2$Si(OD)$_4$:Eu$^{2+}$, D=F, Cl, S, N, Br greenish yellow, Ba$_2$MgSi$_2$O$_7$:Eu$^{2+}$ green, Ba$_2$SiO$_4$:Eu$^{2+}$ green, Ca$_3$(Sc, Mg)$_2$Si$_3$O$_{12}$:Ce$^{3+}$ green, sulfide-based fluorescent materials; (Ca, Sr)S:Eu$^{2+}$ red, (Sr, Ca)Ga$_2$S$_4$:Eu$^{2+}$ green, oxynitrides; SrSi$_2$O$_2$N$_2$:Eu$^{2+}$ green, SiAlON:Ce$^{3+}$ bluish green, β-SiAlON:Eu$^{2+}$ greenish yellow, Ca-α-SiAlON:Eu$^{2+}$ orange, Ba$_3$Si$_6$O$_{12}$N$_2$:Eu$^{2+}$ green, nitride-based fluorescent materials; CaAlSiN$_3$:Eu$^{2+}$ red, (Sr, Ca)AlSiN$_3$:Eu$^{2+}$ yellowish red, Sr$_2$Si$_5$N$_8$:Eu$^{2+}$ red, aluminate-based fluorescent materials; (Sr, Ba)Al$_2$O$_4$:Eu$^{2+}$ blue, (Mg, Sr)Al$_2$O$_4$:Eu$^{2+}$ blue, BaMg$_2$Al$_{16}$O$_{27}$:Eu$^{2+}$ blue, oxide-based fluorescent materials; Y$_2$SiO$_5$:Ce blue, Ca$_2$B$_5$O$_9$Cl:Eu blue, BaMgAl$_{14}$O$_{23}$:Eu blue, Ba$_{0.6}$Al$_2$O$_3$:Mn blue, Y$_3$Al$_5$O$_{12}$:Ce green, Gd$_2$O$_3$:Eu red, Y$_2$O$_3$:Eu red, CeO$_2$:Eu red, TiO$_2$:Eu red, YVO$_4$:Eu red, MgSiO$_3$:Mn red, Zn$_3$(PO$_4$)$_2$:Mn red, InBO$_4$:Eu red, (Y, Gd)BO$_3$:Eu red, SrTiO$_3$:Pr red, etc.

The fluorescent layer may include an organic binder resin. The organic binder resin may be cellulose, cellulose acetate, polyamide, epoxy resin, polyester, melamine resin, polyurethane, vinyl resin, silicon resin, acrylic acid ester, methacrylic acid ester, styrene, ethylene, propylene, acryl resin and polymers, copolymers, etc. or derivatives thereof, although not being limited thereto.

The fluorescent layer may include an acryl-based organic binder resin.

As the acryl-based organic binder resin, an acryl-based organic binder resin known in the art may be used without particular limitation.

Specific examples include an acrylate monomer, an acrylate oligomer, a mixture thereof, etc.

As the acrylate monomer, dipentaerythritol hexaacrylate, dipentaerythritol hydroxypentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerotriacrylate, tripropylene glycol diacrylate, ethylene glycol diacrylate, a mixture thereof, etc. may be used. And, as the acrylate oligomer, a urethane acrylate oligomer, an epoxy acrylate oligomer, polyester acrylate, polyether acrylate, a mixture thereof, may be used.

In the fluorescent layer containing the organic binder resin, the fluorescent material may be contained in an amount of 10-100 parts by weight, specifically 20-80 parts by weight, more specifically 40-60 parts by weight, based on 100 parts by weight of the organic binder resin.

If the fluorescent material is contained in an amount less than 10 parts by weight, binding efficiency may decrease as the amount of the organic binder resin is increased relatively. And, if it is contained in an amount exceeding 100 parts by weight, the required binding effect may not be achieved since the amount of the organic binder resin is decreased relatively.

The fluorescent layer may have a thickness of 10-500 nm.

More specifically, the fluorescent layer may have a thickness of 10-500 nm, specifically 50-300 nm, more specifically 100-200 nm.

If the thickness of the fluorescent layer is smaller than 10 nm, emission characteristics may be decrease upon UV irradiation. And, if the thickness exceeds 500 nm, adhesivity to the surface of the metal oxide-containing coating layer may decrease.

The fluorescent layer may contain an organic-inorganic hybrid fluorescent material.

If the fluorescent layer contains the organic-inorganic hybrid fluorescent material, security performance is improved significantly because optical characteristics are exhibited both at the UV wavelength where the organic fluorescent material particle exhibits optical characteristics and the UV wavelength where the inorganic fluorescent material particle exhibits optical characteristics.

In a specific exemplary embodiment, if the organic fluorescent material particle exhibits optical characteristics at a UV wavelength of 365 nm and the inorganic fluorescent material particle exhibits optical characteristics at a UV wavelength of 254 nm, the organic-inorganic hybrid fluorescent material exhibits optical characteristics at both the UV wavelengths of 365 nm and 254 nm.

The organic fluorescent material and the inorganic fluorescent material may be contained in the form of powders through milling. A pigment containing a nanosized organic-inorganic hybrid fluorescent material powder may be formed by milling the organic fluorescent material and the inorganic fluorescent material.

The pearlescent pigment for security purposes may be used in security products such as paints, coatings, powder coatings, printing inks, coating compositions, plastics, adhesives, papermaking stocks, construction materials, rubber compositions, etc.

In addition, the pearlescent pigment for security purposes may be used in bank notes, checks, bank credit cards, check cards, securities, identity documents, certificates of authentication, revenue stamps, postage stamps, identification cards, train or airplane tickets, admission tickets, telephone cards, label, test stamps, packaging materials, etc.

The content of the pearlescent pigment for security purposes may be 0.01-30 wt % based on the total weight of the security product.

Hereinafter, the present disclosure will be described in detail through examples and test examples. However, the following examples are for illustrative purposes only and it will be apparent to those of ordinary skill in the art that the scope of the present disclosure is not limited by the examples.

<Preparation Example 1> Preparation of Organic Fluorescent Material Particle-Coated Security Pigment (1) Preparation of Organic Binder Solution Containing Organic Fluorescent Material Particle After adding 36 g of an acryl-based organic binder resin, 43 g of single distilled water, 0.5 g of a dispersing agent and 0.5 g of a defoamer to a 250-mL beaker, stirring was conducted for at least 1 hour using a magnetic bar. After mixing the binder solution through stirring and adding 20 g of a Eu(TTA)3Phen-based organic fluorescent material, stirring was conducted for 1 hour using a magnetic bar.

The prepared organic binder solution was added to a 250-mL PE bottle for ball milling together with 450 g of $ZrO_2$ balls and milling was conducted for 35-72 hours.

(2) Preparation of Security Pigment Containing Organic Fluorescent Material Particle-Coated Flake Substrate After adding 50 g of plate-like alumina substrate and 450 g of methanol to a 1-L beaker, a substrate suspension was formed by stirring and dispersing the same at 20-25° C. and 300 rpm.

Then, 12.5 g of the organic binder solution was titrated into the substrate suspension using a pump. After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried flake substrate was screened using a mesh and the flake substrate formed with a larger size than the predetermined size was separated or the particle aggregated during the reaction was removed. Through this process, a security pigment with the organic fluorescent material coated on the surface of the flake substrate was prepared.

FIG. 1 shows the SEM image of the prepared security pigment. It can be seen that, in the prepared security pigment, the organic fluorescent material is coated on the surface of the flake substrate <Preparation Example 2> Preparation of Organic Fluorescent Material Particle-Coated Security Pigment (1) Preparation of Mixture Organic Solvent wherein Organic Fluorescent Material is Dissolved After preparing 60 g of a mixture organic solvent consisting of 80 parts by weight of acetone, 15 parts by weight of methanol, 3 parts by weight of toluene and 2 parts by weight of MEK in a 100-mL beaker, stirring was conducted at 20-25° C. for 10 minutes.

After adding 0.5 g of a Eu(TTA)3Phen-based organic fluorescent material to the mixture organic solvent, a mixture organic solvent solution wherein the organic fluorescent material was dissolved was prepared by conducting stirring for 5 minutes using a magnetic bar.

(2) Preparation of Security Pigment Containing Organic Fluorescent Material Particle-Coated Flake Substrate 10 g of plate-like alumina substrate was added to a 100-mL beaker. Then, the mixture organic solvent wherein the organic fluorescent material was dissolved was added to the beaker and the organic solvent was evaporated by conducting stirring at 60° C. and 300 rpm. After all the organic solvent was evaporated, the dried flake substrate was screened using a mesh. The flake substrate formed with a larger size than 100 μm was separated or the particle aggregated during the reaction was removed. Through this process, a security pigment with the organic fluorescent material coated on the surface of the flake substrate was prepared.

Figure 2:
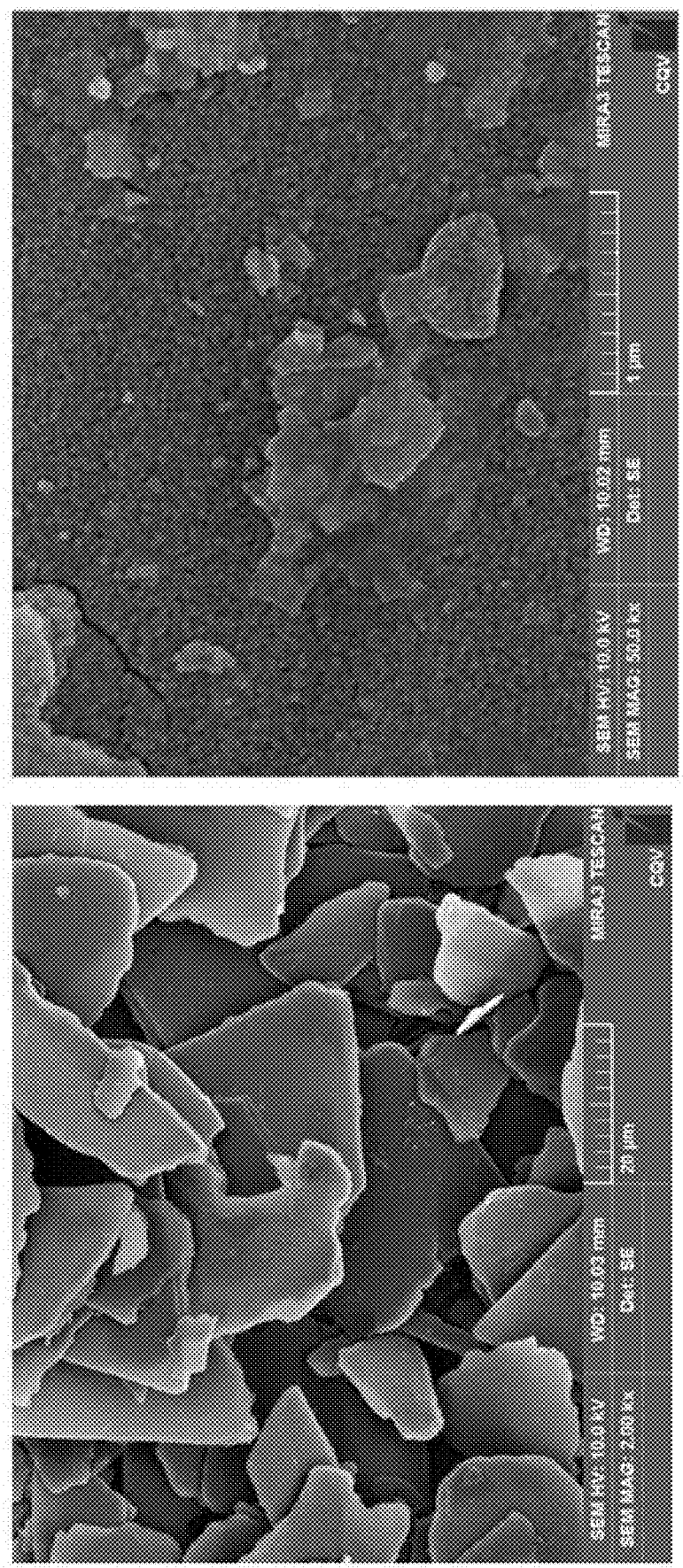
FIG. 2 shows the SEM images of an organic fluorescent material-coated security pigment prepared according to an exemplary embodiment of the present disclosure.

The SEM image of the prepared security pigment is shown in FIG. 2. It can be seen that, in the prepared security pigment, the organic fluorescent material is coated on the surface of the flake substrate <Preparation Example 3> Preparation of Inorganic Fluorescent Material Particle-Coated Security Pigment (1) Preparation of Organic Binder Solution Containing Inorganic Fluorescent Material Particle After adding 36 g of an acryl-based organic binder resin, 43 g of single distilled water, 0.5 g of a dispersing agent and 0.5 g of a defoamer to a 250-mL beaker, stirring was conducted for at least 1 hour using a magnetic bar. After mixing the binder solution through stirring, 20 g of a $Gd_2O_3$:Eu inorganic fluorescent material was added and stirring was conducted for 1 hour using a magnetic bar.

After adding the prepared organic binder solution to a 250-mL PE bottle for ball milling together with 450 g of $ZrO_2$ balls, milling was conducted for 35-72 hours.

(2) Preparation of Security Pigment Containing Inorganic Fluorescent Material Particle-Coated Flake Substrate After adding 50 g of a plate-like alumina substrate and 450 g of methanol to a 1-L beaker, a substrate suspension was formed by stirring and dispersing the same at 20-25° C. and 300 rpm. Then, 12.5 g of the organic binder solution was titrated into the substrate suspension using a pump.

After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried flake substrate was screened using a mesh and the flake substrate formed with a larger size than the predetermined size was separated or the particle aggregated during the reaction was removed. Through this process, a security pigment with the inorganic fluorescent material coated on the surface of the flake substrate was prepared.

Figure 3:
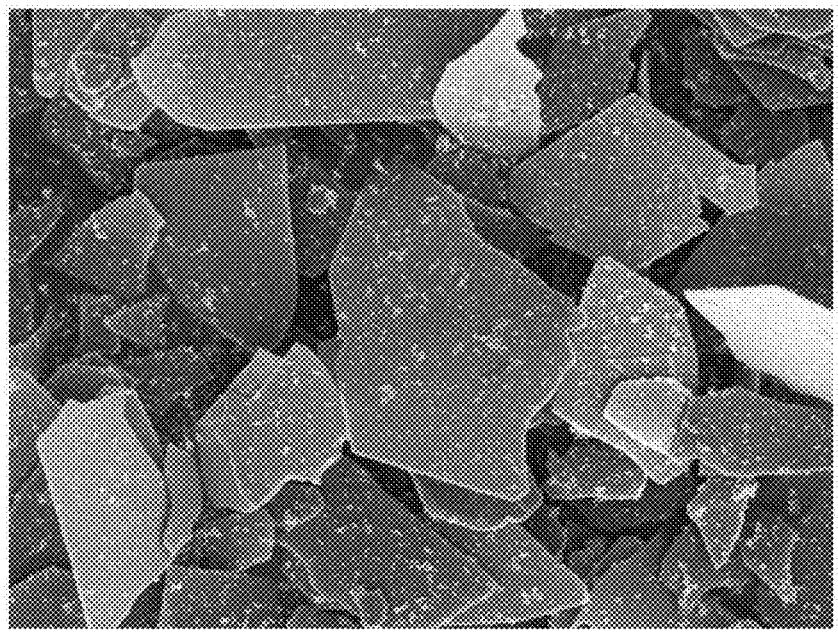
FIG. 3 shows the SEM image of an inorganic fluorescent material-coated security pigment prepared according to an exemplary embodiment of the present disclosure.

The SEM image of the prepared security pigment is shown in FIG. 3. It can be seen that, in the prepared security pigment, the inorganic fluorescent material is coated on the surface of the flake substrate <Preparation Example 4> Preparation of Inorganic Fluorescent Material Particle-Coated Security Pigment After adding 10 g of a Gd2O3:Eu inorganic fluorescent material and 90 g of single distilled water to a 250-mL bottle for ball milling, a pigment containing an inorganic fluorescent material powder with an average particle diameter of 100-300 nm was prepared by conducting ball milling at 35 Hz for 48 hours (concentration of pigment containing inorganic fluorescent material powder in solution=10 wt %).

Then, after mixing the prepared pigment with sodium hydroxide as an aqueous inorganic salt solution, a pigment suspension was prepared by adjusting pH to 7.

Then, after adding 30 g of plate-like alumina as a flake substrate and 270 g of single distilled water to a 2-L beaker, a substrate suspension was formed by stirring and dispersing the same at 20-25° C. and 300 rpm.

Then, after adjusting pH to 12 by adding a 10% sodium hydroxide solution to the pigment suspension, the substrate suspension was mixed with a 5 wt % $AlCl_3$ solution to adjust pH to 5.5. After terminating the reaction by stirring for 10 minutes, the product was washed with water, dehydrated and then dried at 120° C. for 2 hours. The dried flake substrate was screened using a mesh and the flake substrate formed with a larger size than the predetermined size was separated or the particle aggregated during the reaction was removed.

As a result, a security pigment was prepared wherein the inorganic fluorescent material powder was coated on the surface of the flake substrate.

Figure 4:
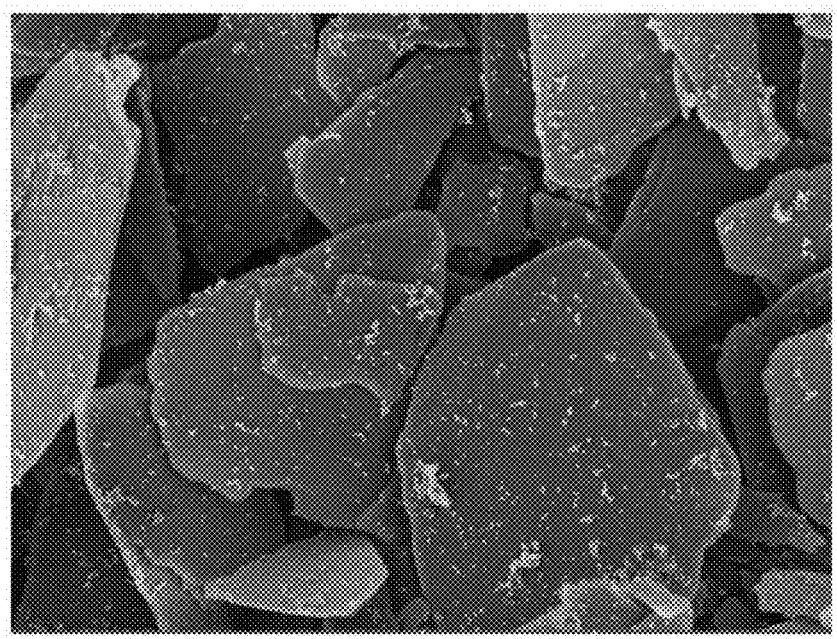
FIG. 4 shows the SEM image of an inorganic fluorescent material-coated security pigment prepared according to an exemplary embodiment of the present disclosure.

The SEM image of the prepared security pigment is shown in FIG. 4. It can be seen that, in the prepared security pigment, the inorganic fluorescent material is coated on the surface of the flake substrate <Preparation Example 5> Preparation of Organic-Inorganic Hybrid Fluorescent Material Particle-Coated Security Pigment (1) Preparation of Organic Binder Solution Containing Organic-Inorganic Hybrid Fluorescent Material Particle After adding 36 g of an acryl-based organic binder resin, 43 g of single distilled water, 0.5 g of a dispersing agent and 0.5 g of a defoamer to a 250-mL beaker, stirring was conducted for at least 1 hour using a magnetic bar. After mixing the binder solution through stirring and then adding 10 g of a Eu(TTA)3Phen-based organic fluorescent material and 10 g of a $Gd_2O_3$:Eu-based inorganic fluorescent material, stirring was conducted for 1 hour using a magnetic bar.

After adding the prepared organic binder solution to a 250-mL PE bottle for ball milling together with 450 g of $ZrO_2$ balls, milling was conducted for 35-72 hours.

(2) Preparation of Security Pigment Containing Organic-Inorganic Hybrid Fluorescent Material Particle-Coated Flake Substrate After adding 50 g of a plate-like alumina substrate and 450 g of methanol to a 1-L beaker, a substrate suspension was formed by stirring and dispersing the same at 20-25° C. and 300 rpm. Then, 25 g of the organic binder solution was titrated into the substrate suspension using a pump. After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried flake substrate was screened using a mesh and the flake substrate formed with a larger size than the predetermined size was separated or the particle aggregated during the reaction was removed.

Through this process, a security pigment wherein the organic fluorescent material and the inorganic fluorescent material were coated on the surface of the flake substrate was prepared.

Figure 5:
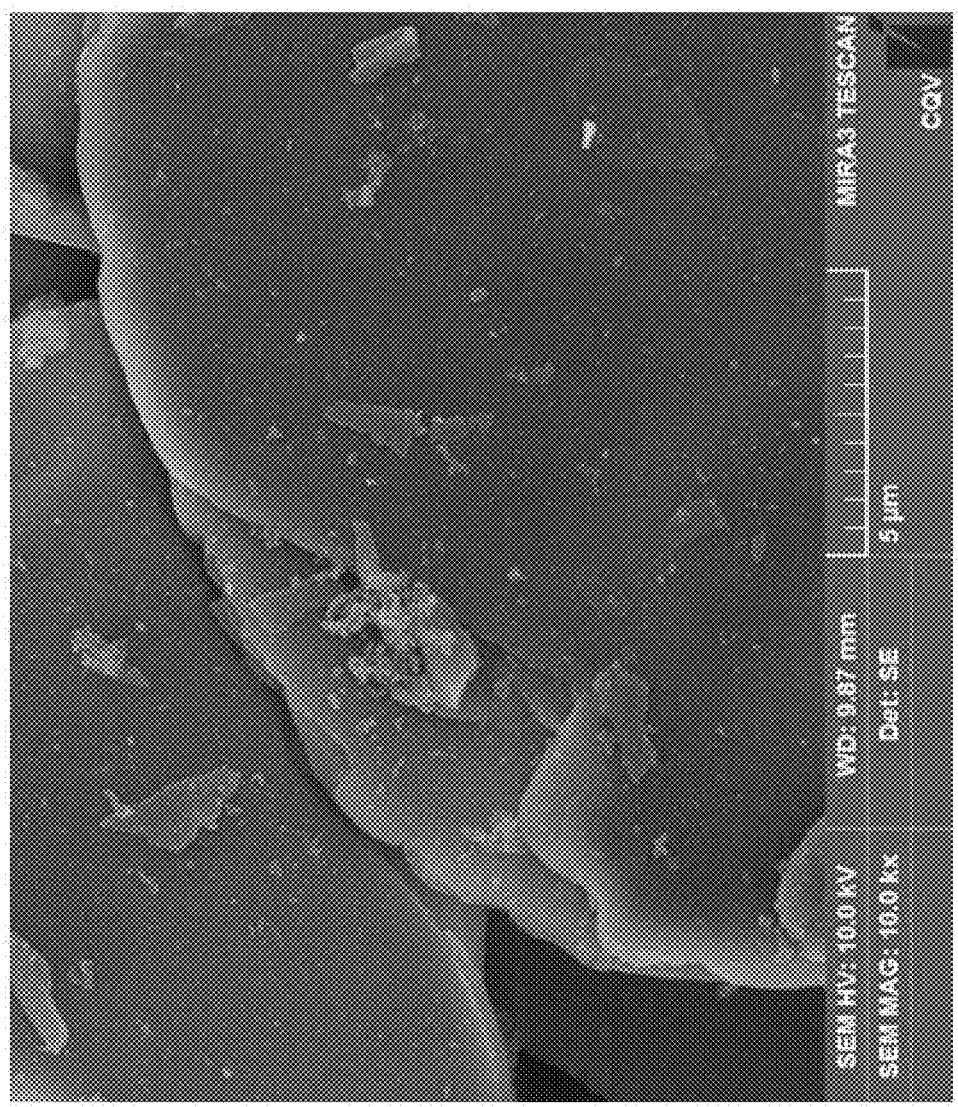
FIG. 5 shows the SEM image of an organic-inorganic hybrid fluorescent material-coated security pigment prepared according to an exemplary embodiment of the present disclosure.

The SEM image of the prepared security pigment is shown in FIG. 5. It can be seen that, in the prepared security pigment, the organic-inorganic hybrid fluorescent material particle is coated on the surface of the flake substrate <Preparation Example 6> Preparation of Organic-inorganic Hybrid Fluorescent Material Particle-coated Security Pigment After adding 5 g of a Eu(TTA)3Phen-based organic fluorescent material, 5 g of a $Gd_2O_3$:Eu-based inorganic fluorescent material and 90 g of single distilled water to a 250-mL bottle for ball milling, a pigment containing organic and inorganic fluorescent material powders with an average particle diameter of 100-300 nm was prepared by conducting ball milling at 35 Hz for 48 hours (concentration of pigment containing organic-inorganic hybrid fluorescent material powder in solution=10 wt %).

Next, a pigment suspension was prepared by mixing the prepared pigment with sodium hydroxide as an aqueous inorganic salt solution and adjusting pH to 7.

Then, a substrate suspension was formed by adding 100 g of plate-like alumina as a flake substrate and 270 g of single distilled water to a 2-L beaker and stirring and dispersing the same at 20-25° C. and 300 rpm.

Then, after adjusting pH to 12 by adding a 10% sodium hydroxide solution to the pigment suspension, the substrate suspension was mixed with a 5 wt % $AlCl_3$ solution to adjust pH to 5.5. After terminating the reaction by stirring for 10 minutes, the product was washed with water, dehydrated and then dried at 120° C. for 2 hours. The dried flake substrate was screened using a mesh and the flake substrate formed with a larger size than the predetermined size was separated or the particle aggregated during the reaction was removed.

As a result, a security pigment wherein the organic fluorescent material and the inorganic fluorescent material were coated on the surface of the flake substrate was prepared.

Figure 6:
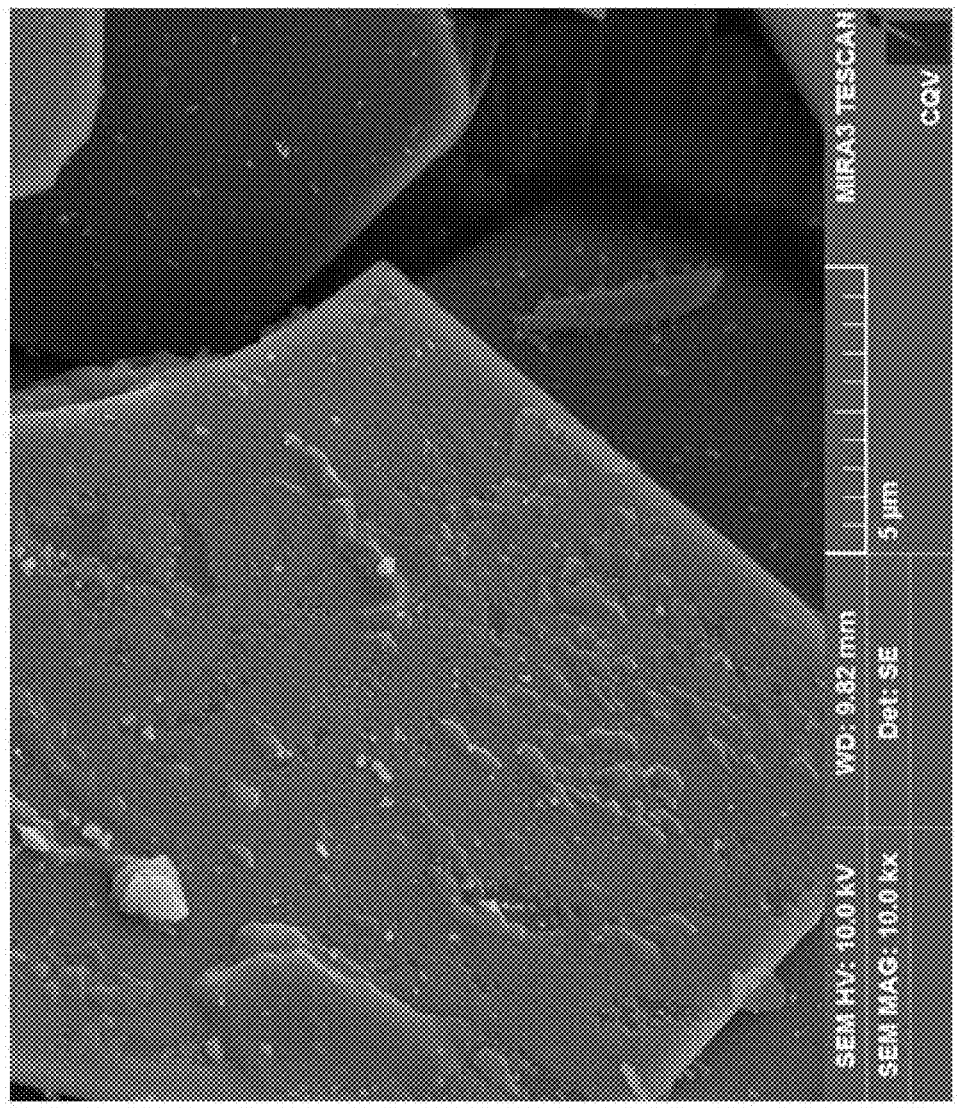
FIG. 6 shows the SEM image of an organic-inorganic hybrid fluorescent material-coated security pigment prepared according to an exemplary embodiment of the present disclosure.
Figure 7:
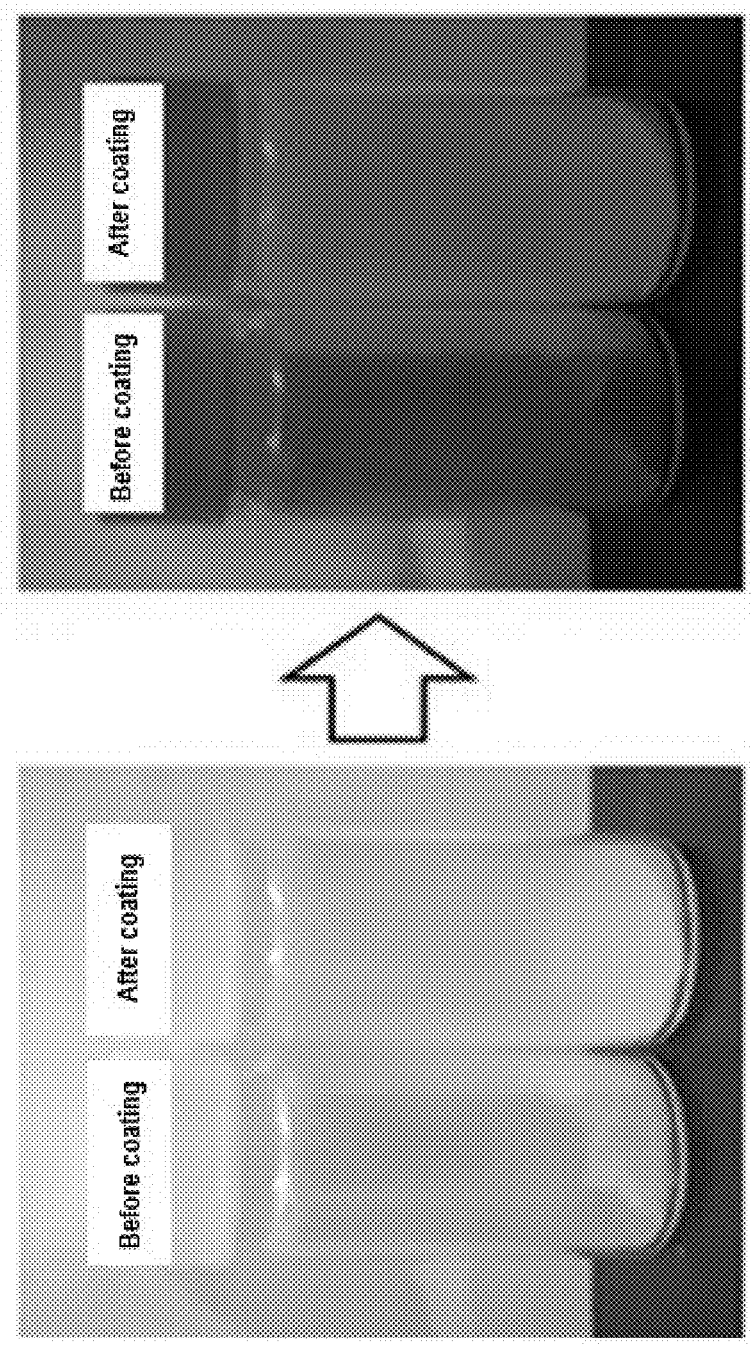
FIG. 7 shows the optical characteristics of an organic fluorescent material-coated security pigment prepared according to an exemplary embodiment of the present disclosure.

The SEM image of the prepared security pigment is shown in FIG. 6. It can be seen that, in the prepared security pigment, the organic-inorganic hybrid fluorescent material particle is coated on the surface of the flake substrate <Test Example 1> Confirmation of Optical Characteristics of Organic Fluorescent Material Particle-Coated Security Pigment (1) Observation of Emission Characteristics In order to confirm the emission characteristics of the organic fluorescent material particle-coated security pigment, 365-nm UV light was irradiated to the security pigment prepared in Preparation Example 1 and a pigment not coated with an organic fluorescent material (before coating). The result is shown in FIG. 7.

It can be seen that the organic fluorescent material particle-coated security pigment according to the present disclosure exhibited emission characteristics, whereas the pigment not coated with the organic fluorescent material did not exhibit emission characteristics.

(2) Analysis of Emission Spectrum

Figure 8:
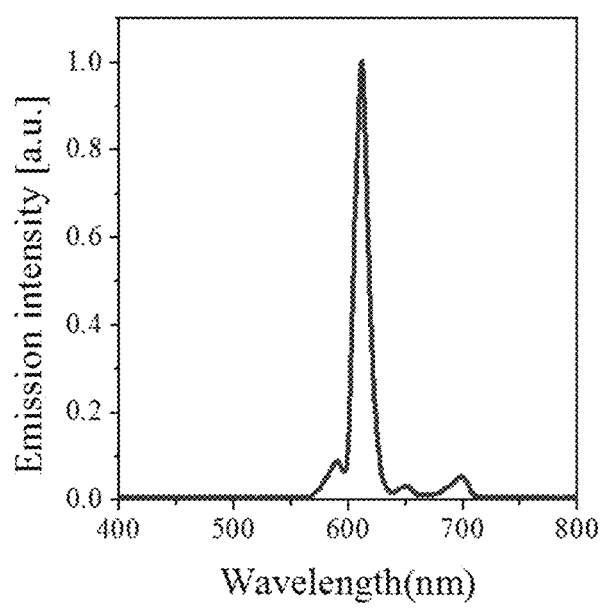
FIG. 8 shows the emission spectrum of an organic fluorescent material-coated security pigment prepared according to an exemplary embodiment of the present disclosure.

After irradiating 365-nm UV light to the security pigment prepared in Preparation Example 1, emission spectrum was measured in a range from 400 nm to 800 nm. The result is shown in FIG. 8.

It can be seen that the organic fluorescent material-coated security pigment according to the present disclosure has an emission peak at 625±30 nm upon irradiation of the 365-nm UV light.

Figure 9:
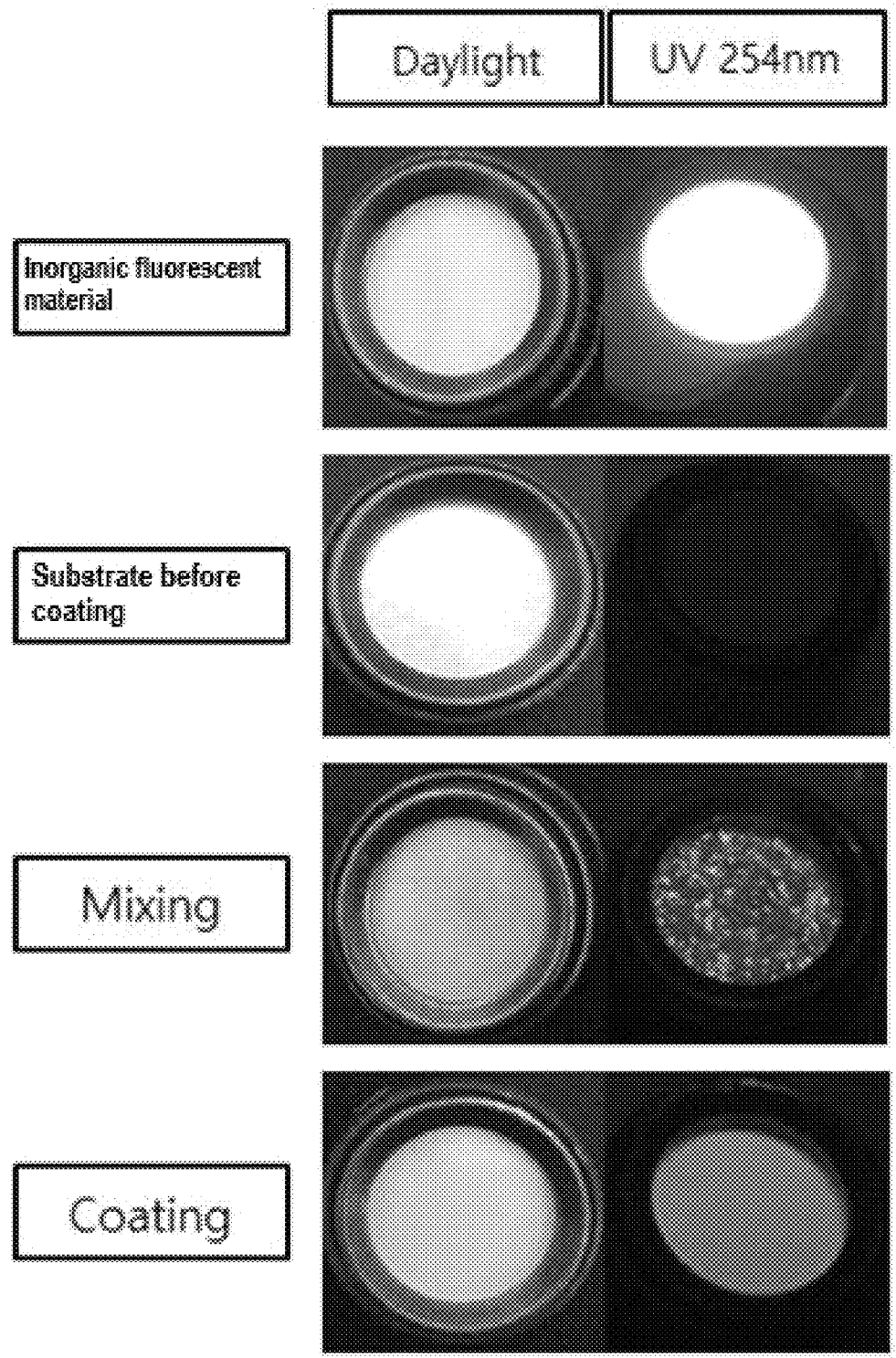
FIG. 9 compares the optical characteristics of an inorganic fluorescent material-coated security pigment prepared according to an exemplary embodiment of the present disclosure with an inorganic fluorescent material, a substrate before coating and a mixture of an inorganic fluorescent material and a substrate before coating.

<Test Example 2> Confirmation of Optical Characteristics of Inorganic Fluorescent Material Particle-Coated Security Pigment (1) Observation of Emission Characteristics In order to confirm the emission characteristics of the inorganic fluorescent material particle-coated security pigment, the security pigment prepared in Preparation Example 3 (coating), the $Gd_2O_3$:Eu inorganic fluorescent material, alumina flake with no metal oxide coated on the surface (substrate before coating), and a mixture of the $Gd_2O_3$:Eu inorganic fluorescent material and alumina flake with no metal oxide coated on the surface (mixing) were prepared. After exposure to daylight and 254-nm UV light, the emission characteristics were investigated. The result is shown in FIG. 9.

Upon exposure to daylight, it was not easy to distinguish the pearlescent gloss characteristics of the substrate before coating and the coated substrate of Preparation Example 3. In contrast, upon exposure to the 254-nm UV light, the substrate of Preparation Example 3 showed red emission characteristics unlike the substrate before coating.

In addition, Preparation Example 3 (coating) showed uniform red emission characteristics as compared to the mixture of the inorganic fluorescent material and the alumina flake with no metal oxide coated on the surface (mixing), since the inorganic fluorescent material nanoparticle was uniformly coated on the substrate surface.

(2) Analysis of Emission Spectrum

Figure 10:
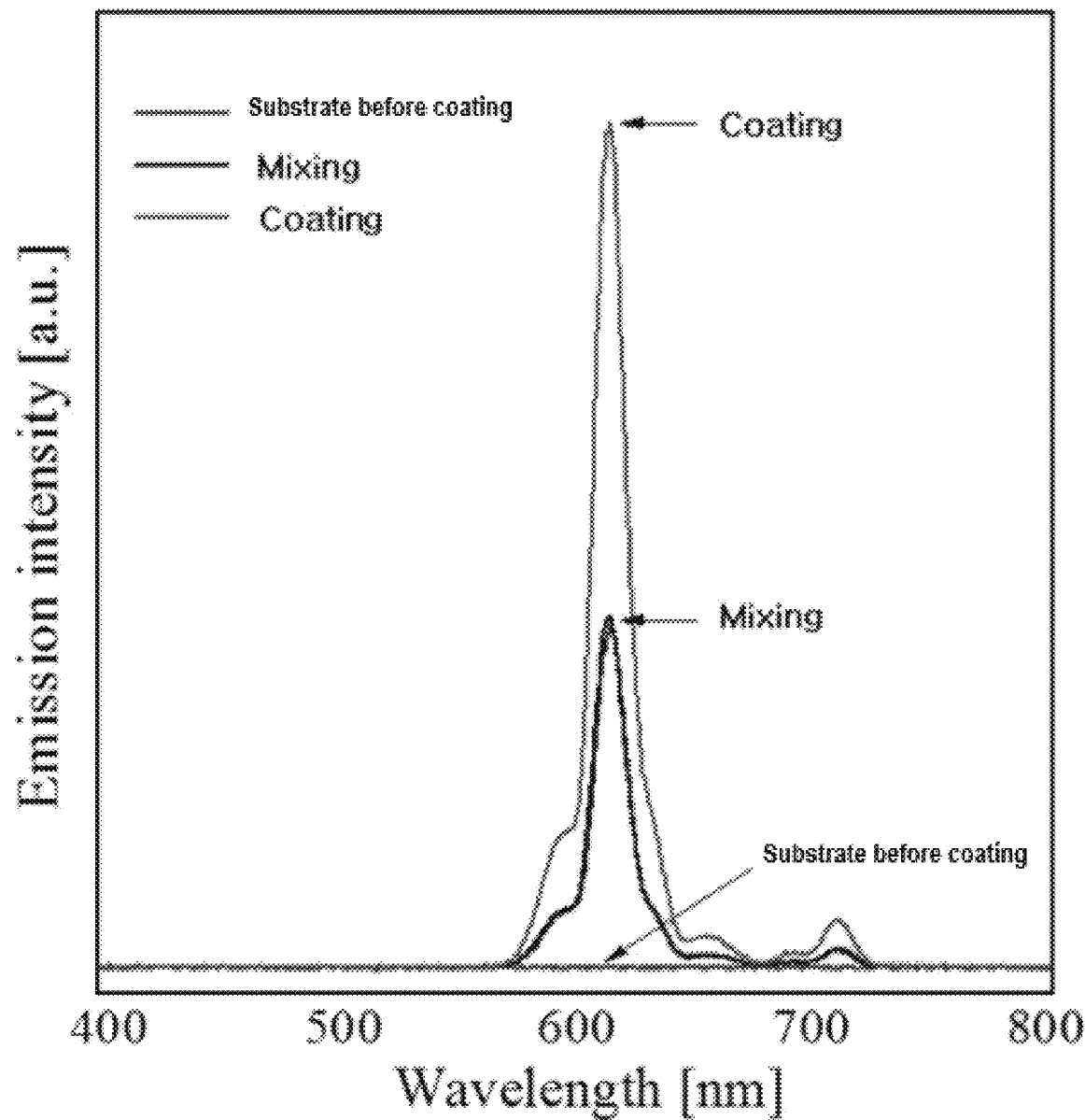
FIG. 10 shows the emission spectrum of an inorganic fluorescent material-coated security pigment prepared according to an exemplary embodiment of the present disclosure, a substrate before coating and a mixture of an inorganic fluorescent material and a substrate before coating.

After irradiating 254-nm UV light to the security pigment prepared in Preparation Example 3, the alumina flake with no metal oxide coated on the surface (substrate before coating), and the mixture of the $Gd_2O_3$:Eu inorganic fluorescent material and the alumina flake with no metal oxide coated on the surface (mixing), emission spectra were measured in a range from 400 nm to 800 nm. The result is shown in FIG. 10.

The emission peak at 612 nm corresponds to the emission from the $^5D0$ excited state to the $^7F_2$ ground state of the $Eu^{3+}$ ion.

No emission was observed for the substrate before coating and Preparation Example 3 (coating) showed higher emission intensity than the mixture of the $Gd_2O_3$:Eu inorganic fluorescent material and the alumina flake with no metal oxide coated on the surface (mixing).

Figure 11:
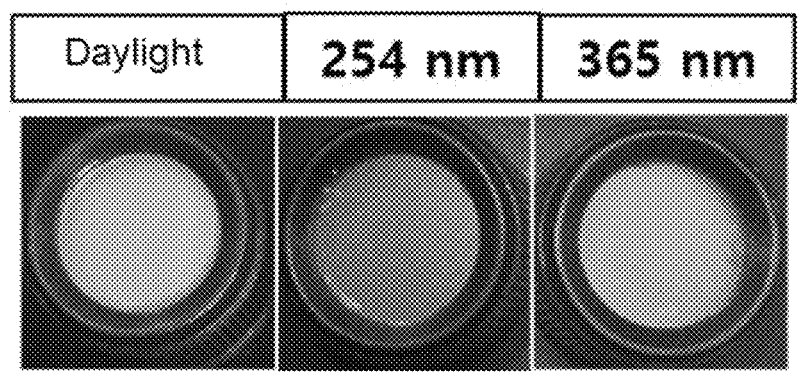
FIG. 11 shows the optical characteristics of an organic-inorganic hybrid fluorescent material-coated security pigment prepared according to an exemplary embodiment of the present disclosure.

<Test Example 3> Confirmation of Optical Characteristics of Organic-Inorganic Hybrid Fluorescent Material Particle-Coated Security Pigment (1) Observation of Emission Characteristics In order to investigate the emission characteristics of the organic-inorganic hybrid fluorescent material particle-coated security pigment, the security pigment prepared in Preparation Example 5 and a pigment not coated with the organic-inorganic hybrid fluorescent material were exposed to daylight and 254-nm or 365-nm UV light. The result is shown in FIG. 11.

It was confirmed that the organic-inorganic hybrid fluorescent material-coated security pigment according to the present disclosure exhibited emission characteristics upon irradiation of 254-nm and 365-nm UV light.

In contrast, the pigment not coated with the organic-inorganic hybrid fluorescent material (left image) did not show emission characteristics.

(2) Analysis of Emission Spectra

Figure 12:
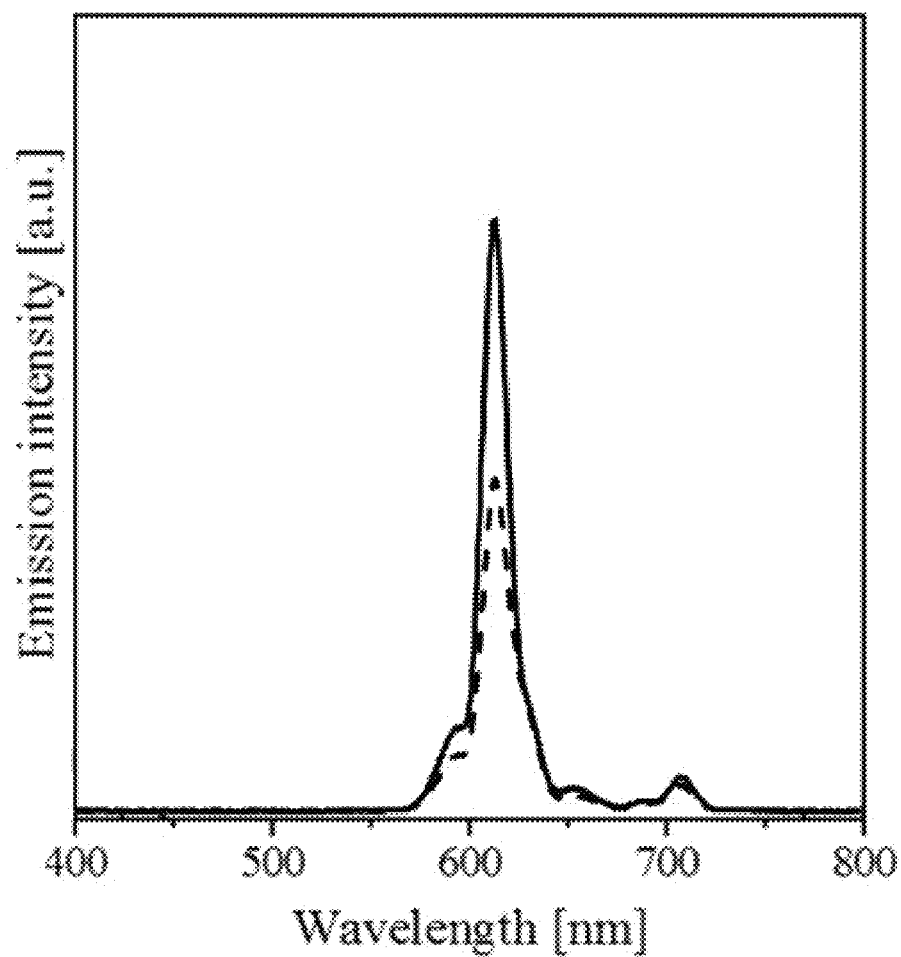
FIG. 12 shows the emission spectrum of an organic-inorganic hybrid fluorescent material-coated security pigment prepared according to an exemplary embodiment of the present disclosure.

After irradiating 254-nm and 365-nm UV light to the security pigment prepared in Preparation Example 5, emission spectra were measured in a range from 400 nm to 800 nm. The result is shown in FIG. 12.

It was confirmed that the organic-inorganic hybrid fluorescent material-coated security pigment showed an emission peak at 625±30 nm upon irradiation of 254-nm and 365-nm UV light.

<Example 1> Preparation of Pearlescent Pigment for Security Purposes Including Substrate, Coating Layer Containing $Fe_3O_4$ and Fluorescent Layer Containing Organic Fluorescent Material (1) Formation of Coating Layer Containing $Fe_3O_4$ First, a dilute sulfuric acid solution was prepared by mixing 1194 g of deionized water and 30 g of sulfuric acid (98%). After adding 294 g of iron sulfate ($FeSO_4 \cdot 7H_2O$) to the dilute solution, a primarily mixed sample was prepared by dissolving the iron sulfate by refluxing the mixture solution for 30 minutes.

After adjusting the temperature of the primarily mixed sample to 20-30° C., a coating solution was prepared by adding 74 g of potassium nitrate (KNOB) and dissolving for 30 minutes.

Next, after dispersing 100 g of a plate-like alumina substrate in 1000 g of deionized water, the temperature was raised to 75° C. Then, coating was conducted using 100 mL of a dilute Ti metal salt solution under the condition of 75° C. and pH 1.5-2.5. After the coating was completed, followed by refluxing for 30 minutes, the reaction solution was stabilized by refluxing for 30 minutes under the condition of 80° C. and pH 9.0.

A black iron oxide layer exhibiting magnetism was formed by adding the prepared coating solution to the stabilized reaction solution at a rate of 250 mL/hr. After the reaction was completed, the sample was washed with deionized water, dehydrated and then dried at 60° C. for at least 12 hours.

(2) Formation of Fluorescent Layer Containing Organic Fluorescent Material

After adding 36 g of an acryl-based organic binder resin, 43 g of single distilled water, 0.5 g of a dispersing agent and 0.5 g of a defoamer to a 250-mL beaker, mixing was conducted by stirring for at least 1 hour using a magnetic bar.

After the mixing, 20 g of a Eu(TTA)3Phen-based organic fluorescent material was added and an organic binder solution containing the organic fluorescent material was prepared by stirring for 1 hour using a magnetic bar. The prepared organic binder solution was added to a 250-mL PE bottle for ball milling together with 450 g of $ZrO_2$ balls and milling was conducted for 35-72 hours.

Next, 50 g of the substrate on which the coating layer containing $Fe_3O_4$ was formed prepared in (1) and 450 g of methanol were added to a 1-L beaker and a substrate suspension was prepared by stirring and dispersing the same at 20-25° C. and 300 rpm. 12.5 g of the organic binder solution was titrated into the prepared substrate suspension using a pump. After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried substrate was screened using a mesh and the flake substrate formed with a larger size than the predetermined size was separated or the particle aggregated during the reaction was removed.

<Example 2> Preparation of Pearlescent Pigment for Security Purposes Including Substrate, Plurality of Coating Layers ($Fe_2O_3$—$MgO.SiO_2$—$Fe_2O_3$) and Fluorescent Layer Containing Organic Fluorescent Material (1) Formation of Plurality of Coating Layers ($Fe_2O_3$—$MgO.SiO_2$—$Fe_2O_3$)

First, a slurry was prepared by adding 100 g of a plate-like alumina substrate to 2 L of demineralized water and stirring the same. After heating the prepared slurry to 75° C., the pH of the slurry was adjusted to 3.5 by adding a hydrochloric acid (HCl) solution.

340 g of an $FeCl_3$ solution ($FeCl_3$ content=20.0 wt %) was weighed and titrated into the slurry over 4 hours at a constant rate. During the titration, the pH was maintained constant using a dilute 10-50% sodium hydroxide (NaOH) solution. After the titration, followed by refluxing for 10 minutes, a first coating layer containing $Fe_2O_3$ was formed by adjusting pH to 6.8 using a dilute 10-30% sodium hydroxide (NaOH) solution.

Next, 400 g of a $MgO.SiO_2$ solution ($MgO.SiO_2$ content=15.0 wt %) was weighed and titrated into the slurry in which the first coating layer was formed over 1 hour at a constant rate. During the titration, the pH was maintained constant at 6.8 using a hydrochloric acid (HCl) solution. After the titration, a second coating layer containing $MgO.SiO_2$ was formed by adjusting pH to 3.5 using a hydrochloric acid (HCl) solution and then conducting refluxing by stirring for 15 minutes.

Finally, 400 g of an $FeCl_3$ solution ($FeCl_3$ content=20.0 wt %) was weighed and titrated into the slurry in which the second coating layer containing $MgO.SiO_2$ was formed over 5 hours at a constant rate. During the titration, the pH was maintained constant at 3.5 using a sodium hydroxide (NaOH) solution.

After the titration, followed by refluxing by stirring for 30 minutes, the pH was adjusted to 8.0-8.5 using a dilute 10-30% sodium hydroxide (NaOH) solution. Then, a final slurry was prepared by refluxing and stirring the slurry for 30 minutes. The final slurry was filtered, dehydrated, washed twice with demineralized water and then dried at 120° C. for 10 hours to obtain an intermediate product in the form of powdery residue.

A bronze powder was obtained by calcining 11 g of the obtained intermediate product at 800° C. for 12 minutes.

(2) Formation of Fluorescent Layer Containing Organic Fluorescent Material

A pigment was prepared by prepared by forming a fluorescent layer containing an organic fluorescent material in the same manner as in <Example 1>, using the substrate wherein the plurality of coating layers ($Fe_2O_3$—$MgO.SiO_2$—$Fe_2O_3$) are formed.

<Example 3> Preparation of Pearlescent Pigment for Security Purposes Including Substrate, Plurality of Coating Layers ($TiO_2$—$MgO.SiO_2$—$TiO_2$) and Fluorescent Layer Containing Organic Fluorescent Material (1) Formation of Plurality of Coating Layers ($TiO_2$—$MgO.SiO_2$—$TiO_2$)

First, a suspension was formed by mixing a plate-like alumina substrate with purified water and the temperature of the suspension was raised to 60-90° C. After titrating a $TiCl_4$ solution into the heated suspension, a first coating layer containing $TiO_2$ was formed on the substrate through hydrolysis.

Next, the temperature of the suspension was raised again to 60-90° C. After titrating a $MgO.SiO_2$ solution into the heated suspension, a second coating layer containing $MgO.SiO_2$ was formed through hydrolysis. The pH of the suspension was maintained at 4-14. After solution injection was completed while maintaining the pH constant, the suspension was refluxed for 30-60 minutes.

Specifically, the pH value was controlled such that the coating ratio of the coating layer containing $MgO.SiO_2$ was 1-30% for a high-chroma, high-gloss pigment, and the coating ratio of the coating layer containing $MgO.SiO_2$ was 30-90% for a multiple-color pigment.

Finally, after raising the temperature of the suspension with the second coating layer containing $MgO.SiO_2$ formed to 60-90° C., the heated suspension was titrated into a $TiCl_4$ solution and a third coating layer containing $TiO_2$ was formed through hydrolysis. Then, the suspension was filtered, washed with deionized water and then dried. The residue was calcined and then screened.

(2) Formation of Fluorescent Layer Containing Organic Fluorescent Material

A pigment was prepared by prepared by forming a fluorescent layer containing an organic fluorescent material in the same manner as in <Example 1>, using the substrate wherein the plurality of coating layers ($TiO_2$—$MgO.SiO_2$—$TiO_2$) are formed.

<Example 4> Preparation of Pearlescent Pigment for Security Purposes Including Substrate, Coating Layer Containing $Fe_3O_4$ and Fluorescent Layer Containing Inorganic Fluorescent Material (1) Formation of Coating Layer Containing $Fe_3O_4$ A substrate with the coating layer containing $Fe_3O_4$ formed was obtained in the same manner as in <Example 1>.

(2) Formation of Fluorescent Layer Containing Inorganic Fluorescent Material 36 g of an acryl-based organic binder resin, 43 g of single distilled water, 0.5 g of a dispersing agent and 0.5 g of a defoamer were added to a 250-mL beaker, and then mixed by stirring for at least 1 hour using a magnetic bar.

After the mixing, an organic binder solution containing an inorganic fluorescent material was prepared by adding 20 g of a $Gd_2O_3$:Eu inorganic fluorescent material and stirring for 1 hour using a magnetic bar. After adding the prepared organic binder solution to a 250-mL PE bottle for ball milling together with 450 g of $ZrO_2$ balls, milling was conducted for 35-72 hours.

Next, a substrate suspension was formed by adding 50 g of the substrate with the coating layer containing $Fe_3O_4$ formed and 450 g of methanol to a 1-L beaker and stirring and dispersing the same at 20-25° C. and 300 rpm. Then, 12.5 g of the organic binder solution was titrated into the substrate suspension using a pump. After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried substrate was screened using a mesh and the substrate formed with a larger size than the predetermined size was separated or the particle aggregated during the reaction was removed.

<Example 5> Preparation of Pearlescent Pigment for Security Purposes Including Substrate, Plurality of Coating Layers ($Fe_2O_3$—$MgO.SiO_2$—$Fe_2O_3$) and Fluorescent Layer Containing Inorganic Fluorescent Material (1) Formation of Plurality of Coating Layers ($Fe_2O_3$—$MgO.SiO_2$—$Fe_2O_3$)

A substrate with a plurality of coating layers ($Fe_2O_3$—$MgO.SiO_2$—$Fe_2O_3$) formed was obtained in the same manner as in <Example 2>.

(2) Formation of Fluorescent Layer Containing Inorganic Fluorescent Material

A pigment was prepared by forming a fluorescent layer containing an inorganic fluorescent material in the same manner as in <Example 4>, using the substrate with the plurality of coating layers ($Fe_2O_3$—$MgO.SiO_2$—$Fe_2O_3$) formed.

<Example 6> Preparation of Pearlescent Pigment for Security Purposes Including Substrate, Plurality of Coating Layers ($TiO_2$—$MgO.SiO_2$—$TiO_2$) and Fluorescent Layer Containing Inorganic Fluorescent Material (1) Formation of Plurality of Coating Layers ($TiO_2$—$MgO.SiO_2$—$TiO_2$)

A substrate with a plurality of coating layers ($TiO_2$—$MgO.SiO_2$—$TiO_2$) formed was obtained in the same manner as in <Example 3>.

(2) Formation of Fluorescent Layer Containing Inorganic Fluorescent Material

A pigment was prepared by forming a fluorescent layer containing an inorganic fluorescent material in the same manner as in <Example 4>, using the substrate with the plurality of coating layers ($TiO_2$—$MgO.SiO_2$—$TiO_2$) formed.

<Example 7> Preparation of Pearlescent Pigment for Security Purposes Including Substrate, Coating Layer Containing $Fe_3O_4$ and Fluorescent Layer Containing Organic-Inorganic Hybrid Fluorescent Material (1) Formation of Coating Layer Containing $Fe_3O_4$ A substrate with a coating layer containing $Fe_3O_4$ formed was obtained in the same manner as in <Example 1>.

(2) Formation of Fluorescent Layer Containing Organic-Inorganic Hybrid Fluorescent Material 36 g of an acryl-based organic binder resin, 43 g of single distilled water, 0.5 g of a dispersing agent and 0.5 g of a defoamer were added to a 250-mL beaker and then mixed by conducting stirring for at least 1 hour using a magnetic bar.

After the mixing, an organic binder solution containing an organic-inorganic hybrid fluorescent material was prepared by adding 10 g of a $Eu(TTA)_3Phen$-based organic fluorescent material and 10 g of a $Gd_2O_3$:Eu inorganic fluorescent material and then stirring for 1 hour using a magnetic bar. After adding the prepared organic binder solution to a 250-mL PE bottle for ball milling together with 450 g of $ZrO_2$ balls, milling was conducted for 35-72 hours.

Next, a substrate suspension was prepared by adding 50 g of the substrate with the coating layer containing $Fe_3O_4$ formed and 450 g of methanol to a 1-L beaker and then stirring and dispersing the same at 20-25° C. and 300 rpm. 12.5 g of the organic binder solution was titrated into the substrate suspension using a pump. After the titration was completed, pH was adjusted to 7.0 by adding a 5% hydrochloric acid solution to the suspension mixture of the substrate suspension and the organic binder solution. Then, after terminating the reaction by stirring for 30 minutes, the product was washed with water, dehydrated and then dried at 80° C. for 30 minutes. The dried substrate was screened using a mesh and the substrate formed with a larger size than the predetermined size was separated or the particle aggregated during the reaction was removed.

<Example 8> Preparation of Pearlescent Pigment for Security Purposes Including Substrate, Plurality of Coating Layers ($Fe_2O_3$—$MgO.SiO_2$—$Fe_2O_3$) and Fluorescent Layer Containing Organic-Inorganic Hybrid Fluorescent Material (1) Formation of Plurality of Coating Layers ($Fe_2O_3$—$MgO.SiO_2$—$Fe_2O_3$)

A substrate with a plurality of coating layers ($Fe_2O_3$—$MgO.SiO_2$—$Fe_2O_3$) formed was obtained in the same manner as in <Example 2>.

(2) Formation of Fluorescent Layer Containing Organic-Inorganic Hybrid Fluorescent Material A pigment was prepared by forming a fluorescent layer containing an organic-inorganic hybrid fluorescent material in the same manner as in <Example 7>, using the substrate with the plurality of coating layers ($Fe_2O_3$—$MgO.SiO_2$—$Fe_2O_3$) formed.

<Example 9> Preparation of Pearlescent Pigment for Security Purposes Including Substrate, Plurality of Coating Layers ($TiO_2$—$MgO.SiO_2$—$TiO_2$) and Fluorescent Layer Containing Organic-Inorganic Hybrid Fluorescent Material (1) Formation of plurality of coating layers ($TiO_2$—$MgO.SiO_2$—$TiO_2$)

A substrate with a plurality of coating layers ($TiO_2$—$MgO.SiO_2$—$TiO_2$) formed was obtained in the same manner as in <Example 3>.

(2) Formation of Fluorescent Layer Containing Organic-Inorganic Hybrid Fluorescent Material A pigment was prepared by forming a fluorescent layer containing an organic-inorganic hybrid fluorescent material in the same manner as in <Example 7>, using the substrate with the plurality of coating layers ($TiO_2$—$MgO.SiO_2$—$TiO_2$) formed.

The invention claimed is:

1. A pearlescent pigment, comprising:
   a flake substrate;
   a coating layer formed on the flake substrate; and and
   a fluorescent layer formed on the coating layer, the fluorescent layer comprising a fluorescent material;
   wherein the coating layer comprises:
      a first coating layer comprising at least one of $Fe_3O_4$, $Fe_2O_3$ and $TiO_2$;
      a second coating layer formed on the first coating layer, the second coating layer comprising $MgO.SiO_2$; and
      a third coating layer formed on the second coating layer, the third coating layer comprising at least one of $Fe_3O_4$, $Fe_2O_3$ and $TiO_2$,
   wherein the fluorescent layer comprises an organic-inorganic hybrid fluorescent material comprising:
      an organic fluorescent material selected from a group consisting of tetraphenylnaphthacene, tris(1-pentyl-isoquinoline)iridium(III), bis(2-benzo[b]thiophen-2-yl-pyridine)(acetylacetonate)iridium(III), tris[4,4'-di-tert-butyl-(2,2)-bipyridine]ruthenium(III), DCM1 (4-dicayanomethylene-2-methyl-6-(p-dimethylaminostyryl)-4H-pyran), DCM2 (4-dicayanomethylene-2-methyl-6-(julolidin-4-yl-vinyl)-4H-pyran), butyl-6-(1,1,7,7-tetramethyljulolidinyl-9-enyl)-4H-pyran), (1,10-phenanthroline)-tris-(4,4,4-trifluoro-1-(2-thienyl)-butane-1,3-dionate)europium(III), and a combination thereof; and
      an inorganic fluorescent material selected from the group consisting of $Y_2SiO_5$:Ce blue, $Ca_2B_5O_9Cl$:Eu blue, $BaMgAl_{14}O_{23}$:Eu blue, $Ba_{0.6}Al_2O_3$:Mn blue, $Y_3Al_5O_{12}$:Ce green, $Gd_2O_3$:Eu red $CeO_2$:Eu red, $TiO_2$:Eu red, $YVO_4$:Eu red, $MgSiO_3$:Mn red, $Zn_3(PO_4)_2$:Mn red, $InBO_4$:Eu red, (Y, Gd)$BO_3$:Eu red, $SrTiO_3$:Pr red and a combination thereof.

2. The pearlescent pigment of claim 1, wherein the fluorescent material is an organic fluorescent material comprising a particle having an average particle diameter ($D_{50}$) of 10-200 nm.

3. The pearlescent pigment of claim 1, wherein the fluorescent layer comprises an acryl-based organic binder resin.

4. The pearlescent pigment of claim 1, wherein the fluorescent layer has a thickness of 10-500 nm.

5. A security product to which the pearlescent pigment of claim 1 is applied, wherein the security product is any one of a medicine, a machinery part, a bank note, a check, a credit card, a check card, a security, a gift certificate, a passport, a resident card, a driver's license, an identity document, a certificate of authentication, a revenue stamp, a postage stamp, an identification card, a train ticket, an airplane ticket, an admission ticket, a telephone card, a label, a test stamp and a packaging material.

6. The pearlescent pigment of claim 1, wherein the coating layer is formed on a surface of the flake substrate; and
   the fluorescent layer is formed on a surface of the coating layer.

7. The pearlescent pigment of claim 1, wherein the flake substrate has a shape of plate with a particle diameter of 5-250 μm.

* * * * *